United States Patent
Lee et al.

(10) Patent No.: US 6,877,336 B2
(45) Date of Patent: Apr. 12, 2005

(54) RECEIVER-DRIER FOR AIR-CONDITIONING SYSTEM AND METHOD OF MANUFACTURING THE SAME

(75) Inventors: Sang Ok Lee, Daejeon (KR); Eun Ki Min, Daejeon (KR); Jin Hee Lee, Daejeon (KR); Sun Ho Bae, Daejeon (KR); Jun Young Shin, Daejeon (KR); Hee Soo Yang, Pyungtaek (KR); Jeong Chan Kang, Anseong (KR)

(73) Assignee: Halla Climate Control Corporation, Daejeon (KR)

( * ) Notice: Subject to any disclaimer, the term of this patent is extended or adjusted under 35 U.S.C. 154(b) by 0 days.

(21) Appl. No.: 10/614,122

(22) Filed: Jul. 8, 2003

(65) Prior Publication Data

US 2004/0007012 A1 Jan. 15, 2004

(30) Foreign Application Priority Data

Jul. 9, 2002 (KR) ............................... 10-2002-0039729

(51) Int. Cl.⁷ ........................ F25B 43/00; F25B 39/04; B23P 15/26; B23P 17/00; B21D 53/06
(52) U.S. Cl. ........................ 62/474; 62/509; 29/890.05; 29/890.07
(58) Field of Search .......................... 62/474, 509, 503, 62/506, 507, 512; 29/890.05, 890.07; 165/132, 143, 110, 173, 175, 176

(56) References Cited

U.S. PATENT DOCUMENTS

| | | | | |
|---|---|---|---|---|
| 6,295,832 B1 | * | 10/2001 | Kato et al. | 62/509 |
| 6,446,463 B2 | * | 9/2002 | Bernini | 62/473 |
| 6,494,059 B2 | * | 12/2002 | Yamazaki et al. | 62/509 |

FOREIGN PATENT DOCUMENTS

| | | | | | |
|---|---|---|---|---|---|
| JP | 09324962 A | * | 12/1997 | ........... | F25B/39/04 |
| JP | 2002107009 A | * | 4/2002 | ........... | F25B/43/00 |
| KR | P2000-0047336 | | 7/2000 | | |
| KR | P2001-0000764 | | 1/2001 | | |

* cited by examiner

Primary Examiner—Chen-Wen Jiang
(74) Attorney, Agent, or Firm—Lowe Hauptman & Berner, LLP

(57) ABSTRACT

In a receiver-drier including a cylindrical body and a lower cap sealing a lower end portion of the body, the body includes a filter support portion sectioning the body into upper and lower portions and having at least one inwardly protruding portion supporting an upper end portion of the filter accommodated in the lower portion of the body, at least one refrigerant inlet formed in the upper portion of the body, a coupling portion formed by inwardly pressing the body between the filter support portion and the lower end portion of the body so that an inner surface of the pressed body is coupled to the lower cap, and at least one refrigerant outlet disposed between the filter support portion and the coupling portion.

8 Claims, 9 Drawing Sheets

RECEIVER-DRIER FOR AIR-CONDITIONING SYSTEM AND METHOD OF MANUFACTURING THE SAME

BACKGROUND OF THE INVENTION

This application claims the priority of Korean Patent Application No. 2002-39729 filed on Jul. 9, 2002 in the Korean Intellectual Property Office, the disclosure of which is incorporated herein in its entirety by reference.

1. Field of the Invention

The present invention relates to a receiver-drier used in a cooling system of an air-conditioning system for a car and a method of manufacturing the same, and more particularly, to a body of the receiver-drier and a method of manufacturing the body.

2. Description of the Related Art

A typical cooling system includes a compressor compressing refrigerant, a condenser condensing the refrigerant compressed by the compressor, an expansion valve rapidly expanding the refrigerant which is liquidized by being condensed by the condenser, and an evaporator evaporating the refrigerant expanded in the expansion valve and cooling air blown into the inside of a car utilizing latent heat of vaporization of the refrigerant.

In the process of cooling, first, the compressor driven by the power of an engine compresses refrigerant at a low temperature and low pressure and supplies the compressed refrigerant to the condenser. The condenser condenses the refrigerant whose phase is changed to a state of a high temperature and a high pressure by the compressor by the blowing operation of a cooling fan to make liquid at a high temperature and a high pressure. The refrigerant in the state of a high temperature and a high pressure by being condensed by the condenser is supplied to the evaporator through the expansion valve. The refrigerant is evaporated in the evaporator, absorbs latent heat of vaporization, and is supplied to the compressor. A blow fan sucks air in and out of a car to blow to the inside of the car through the evaporator so that the cooled air is supplied to the inside of the car and the inside of the car is cooled.

In the above cooling process, the refrigerant continuously phase-changes from gas to liquid and from liquid to gas. If foreign materials such as moisture, for example, is included in the refrigerant, the phase is not smoothly changed during the cooling process so that a cooling system cannot work properly or the cooling system may be corroded. In particular, when moisture is mixed in the refrigerant in a cooling system using a refrigerant such as R-12, since the moisture produces hydrochloric acid hydroxide having a strong corrosion feature with respect to metal in a chemical reaction between moisture and the refrigerant, the cooling system is fatally affected.

To solve the moisture problem, typically, a receiver-drier absorbing moisture mixed in the refrigerant is installed between the compressor and the evaporator in the cooling system.

The receiver-drier has a cylindrical body made of metal such as aluminum or iron and a desiccant and a filter are included in the body. Thus, the moisture in the refrigerant flowing from the compressor to the evaporator is absorbed by the desiccant and foreign materials other than the moisture in the refrigerant is filtered by the filter. In addition, the receiver-drier temporarily stores the refrigerant in response to a change in load of a cooling cycle or separates bobbles included in a liquid refrigerant. Also, when a fusible plug is installed and refrigerant is overheated due to malfunction of the cooling system, the refrigerant is forcibly exhausted by using the fusible plug to protect the cooling system.

3. Description of the Related Art

Korean Patent Publication No. 2000-0047336, as shown in FIG. 1, discloses a receiver-drier 100 including a bush 160 which is additionally manufactured and interposed between a lower cap 130 and the body 110, sealing a gap therebetween. In the receiver-drier 100, since the bush 160 needs to be additionally manufactured and assembled, manufacturing cost and time increases.

In the above publication and Korean Patent Publication No. 2001-0000764, as shown in FIGS. 2 and 3, receiver-drier bodies 210 and 310 are disclosed which are manufactured to have a section capable of coupling a lower cap and a receiver-drier body, forming a seal, by using hammers 200 and 300 operating in a lengthwise direction of the receiver-drier body. In this case, the lengths of the receiver-drier bodies 210 and 310 which can be manufactured in a forging process are limited by apparatuses and power for driving the hammers 200 and 300, or excessive residual stress remains in a material of the receiver-drier bodies manufactured in the above method so that durability is deteriorated.

SUMMARY OF THE INVENTION

To solve the above and/or other problems, the present invention provides a receiver-drier which does not need an additional bush between a body of the receiver-drier and a lower cap and exhibits an improved durability.

According to an aspect of the present invention, a receiver-drier including a cylindrical body and a lower cap sealing a lower end portion of the body, wherein the body comprises: a filter support portion sectioning the body into upper and lower portions and having at least one inwardly protruding portion supporting an upper end portion of the filter accommodated in the lower portion of the body; at least one refrigerant inlet formed in the upper portion of the body; a coupling portion formed by inwardly pressing the body between the filter support portion and the lower end portion of the body so that an inner surface of the pressed body is coupled to the lower cap; and at least one refrigerant outlet disposed between the filter support portion and the coupling portion.

The protruding portion is formed by pressing the body inwardly.

According to another aspect of the present invention, a receiver-drier including a cylindrical body and a lower cap sealing a lower end portion of the body, wherein the body comprises: a filter support portion sectioning the body into upper and lower portions and having at least one protruding portion inwardly pressed to support an upper end portion of the filter accommodated in the lower portion of the body; at least one refrigerant inlet formed in the upper portion of the body; a coupling portion disposed between the filter support portion and the lower end portion of the body so that an inner surface of the pressed body is coupled to the lower cap; and at least one refrigerant outlet disposed between the filter support portion and the coupling portion.

The coupling portion is pressed toward the inside of the body and a thread is provided on an inner surface of the pressed body.

The filter support portion further comprises a support ring supported by the protruding portion.

The support ring has a rib extending from an outer circumferential portion of the support ring parallel to the body and the supporting ring is supported as the rib is inserted in the protruding portion, has a groove on an outer circumferential side surface of the support ring and the support ring is supported as the pressed protruding is inserted in the groove, is supported by the pressed protruding portions closely contacting upper and lower surfaces of an outer circumferential surface of the support ring, and has at least one acute angle portion on an outer circumferential side surface of the support ring and is supported as the acute angle portion is inserted in the pressed protruding portion.

The body is an extruded tube.

A filter filtering refrigerant which enters through the refrigerant inlet and is exhausted through the refrigerant outlet is provided in the upper portion of the lower cap.

According to another aspect of the present invention, a method of manufacturing a receiver-drier including a body forming step, wherein the body forming step comprises the steps of: preparing a cylinder enclosed by a wall having a predetermined wall; forming a filter support portion sectioning the body into upper and lower portions and having at least one inwardly protruding portion supporting an upper end portion of the filter accommodated in the lower portion of the body; forming a coupling portion to be coupled to the lower cap on an inner surface of the cylinder between the filter support portion and the lower end portion of the cylinder; forming at least one refrigerant inlet in the upper portion of the body; and forming at least one refrigerant outlet between the filter support portion and the coupling portion, in which at least one of the filter support portion forming step and the coupling portion forming step comprise a sub-step of pressing the cylinder from outside by rolling.

The filter support portion forming step further comprises sub-steps of inserting a support ring having a rib formed on an outer circumferential portion of the support ring to extend parallel to the cylinder in an inner surface of the protruding portion, locating a support ring having a groove on an outer circumferential portion inside the cylinder and pressing the cylinder from outside by rolling to insert the pressed protruding portion in the groove, locating a support ring inside the cylinder and pressing the cylinder from outside at upper and lower adjacent positions by rolling to insert the support ring between the pressed protruding portions, and locating a support ring having an acute angle portion on the outer circumferential portion of the support ring inside the cylinder and pressing the cylinder from outside by rolling to insert the acute angle portion in the pressed protruding portion.

The coupling portion forming step comprises a sub-step of forming a thread on an inner surface of the coupling portion.

The cylinder preparing step comprises sub-steps of extruding a pipe which is a base material of the cylinder and cutting the pipe by a predetermined length.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
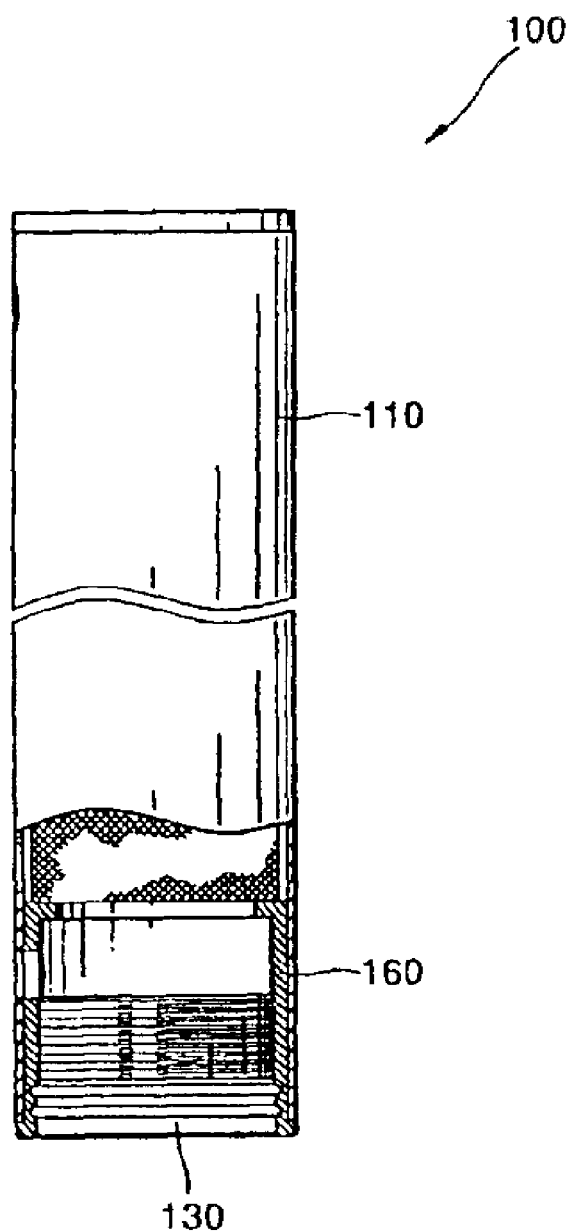
FIG. 1 is a partially cut-away view illustrating part of a conventional receiver-drier.
Figure 2:
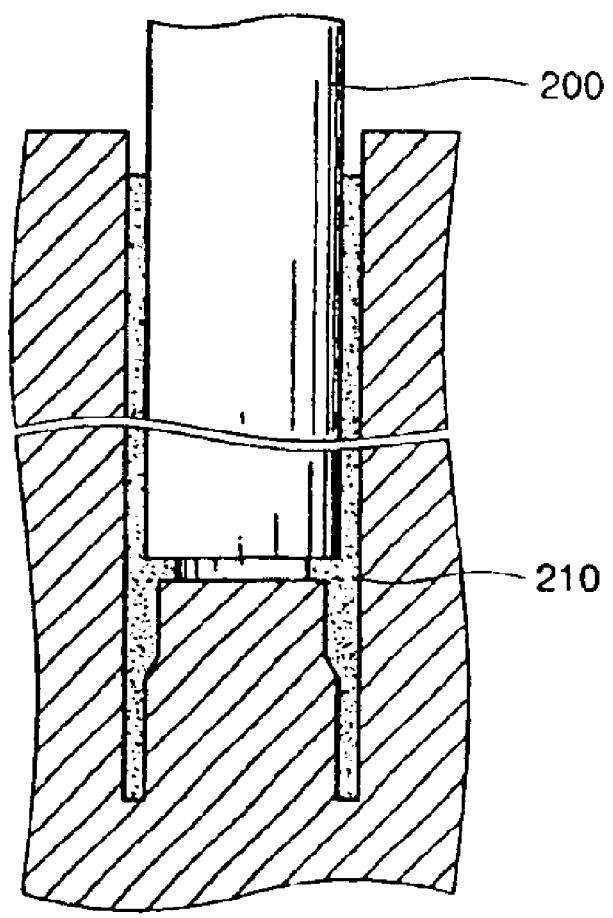
FIG. 2 is a sectional view illustrating a state of forging to manufacture a body of another conventional receiver-drier.
Figure 3:
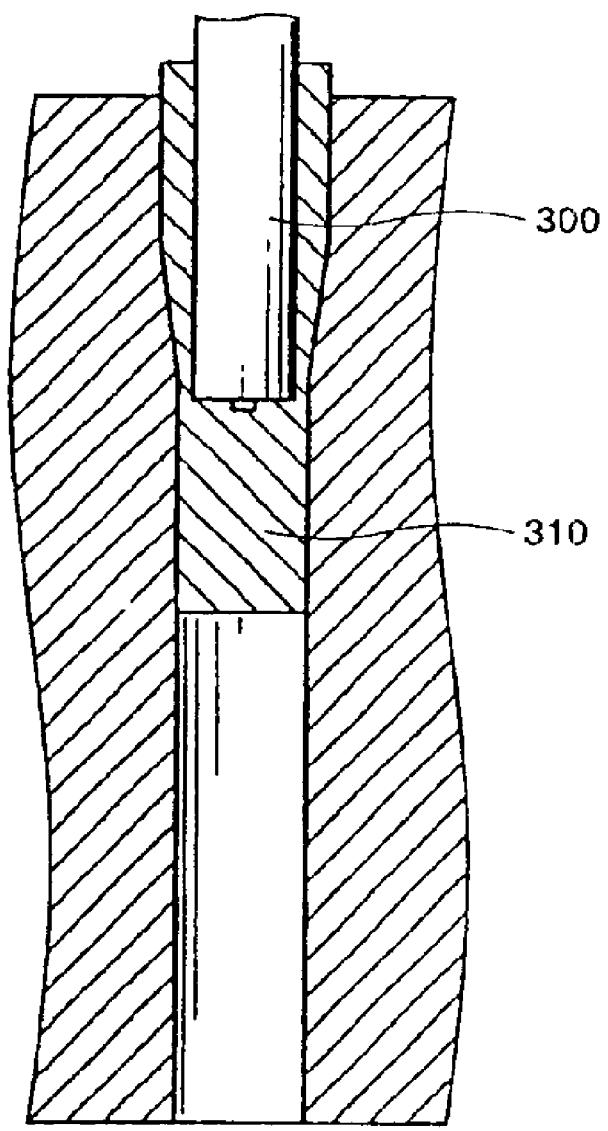
FIG. 3 is a sectional view illustrating a state of forging to manufacture a body of yet another conventional receiver-drier.
Figure 4:
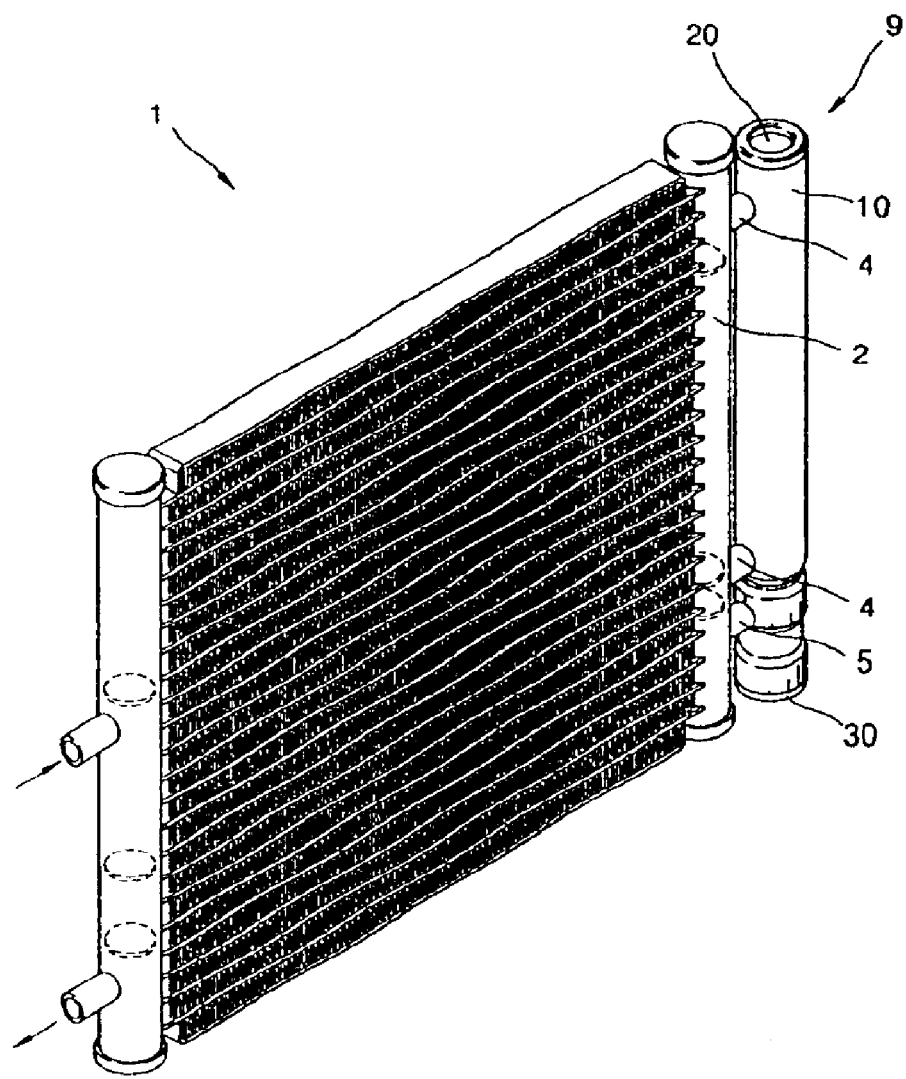
FIG. 4 is a perspective view illustrating a condenser of a receiver-drier according to a preferred embodiment of the present invention.
Figure 5:
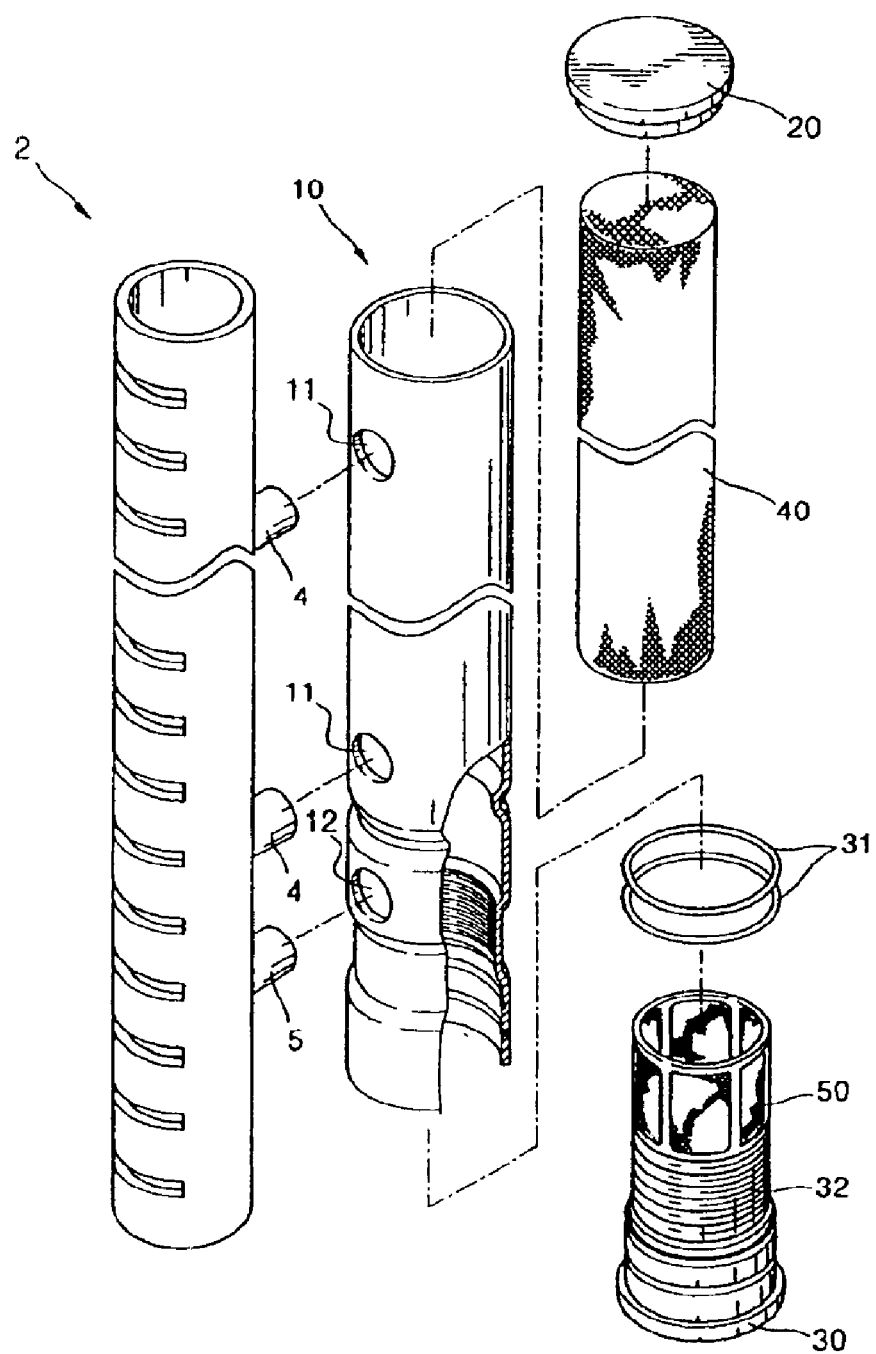
FIG. 5 is an exploded perspective view illustrating a receiver-drier according to a preferred embodiment of the present invention.

Referring to FIG. 4, a receiver-drier 9 according to a preferred embodiment of the present invention is connected to a header pipe 2 so as to be integrally formed with a condenser 1. FIG. 5 is an exploded perspective view of the receiver-drier 9. Refrigerant has a flow path along which the refrigerant enters the receiver-drier 9 through a refrigerant input pipe 4 and is exhausted to the outside of the receiver-drier 9 through a refrigerant output pipe 5.

The receiver-drier 9, as shown in FIG. 5, includes a body 10 accommodating a desiccant 40 inside the body 10 where a refrigerant path passing the desiccant 40 is formed, an upper cap 20, and a lower cap 30 sealing a lower end portion of the body 10. The body 10 has a shape of a tube having a circular section and is preferably a tube manufactured in an extrusion process method.

The upper cap 20 may be separately manufactured and fixedly sealed to an upper end portion of the body 10 in a welding method, or integrally formed with the body 10. Although in the present preferred embodiment the upper cap 20 is additionally manufactured and fixedly sealed to the upper end portion of the body 10, the present invention is not limited thereto.

Figure 6:
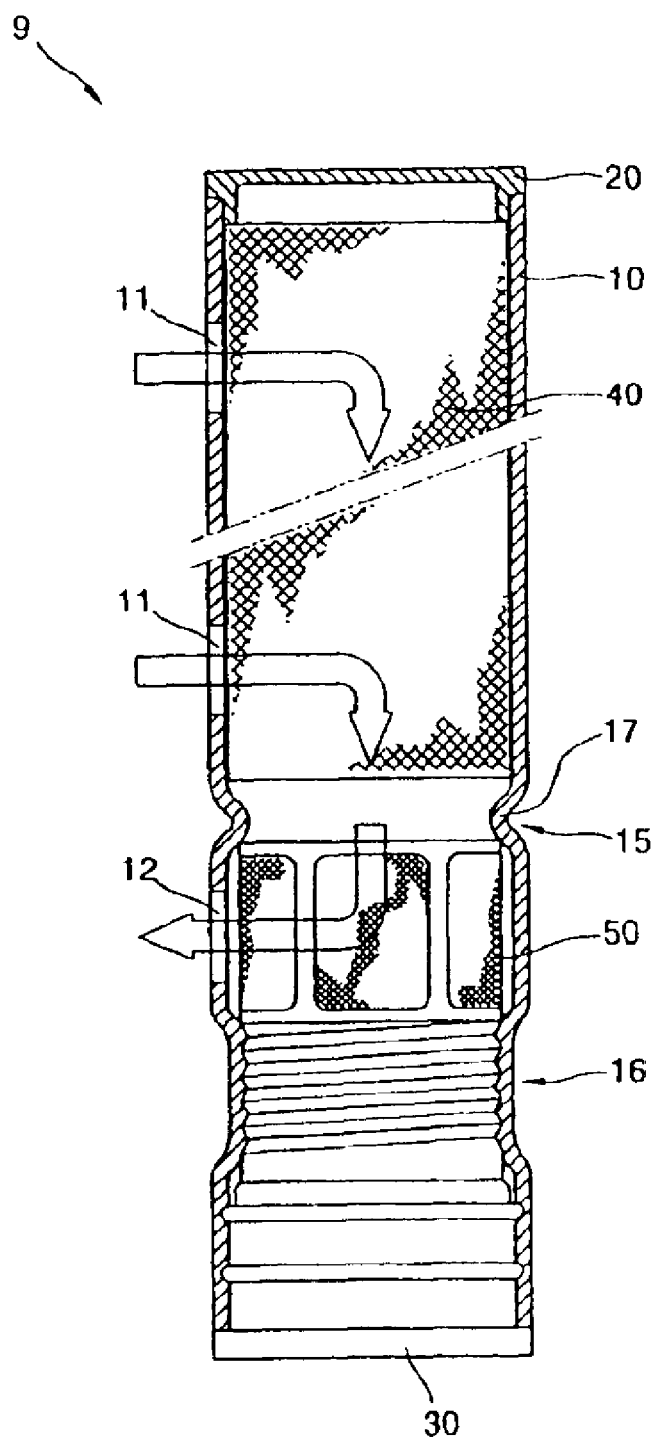
FIG. 6 is a sectional view illustrating the receiver-drier of FIG. 5.
Figure 7:
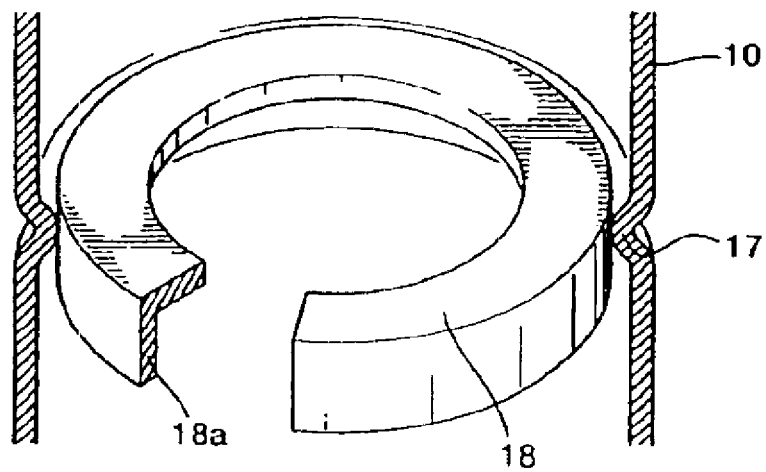
FIG. 7 is a partially cut-away view illustrating a state in which a support ring where a rib is formed at an outer circumferential portion hereof is inserted in a protruding portion.
Figure 8:
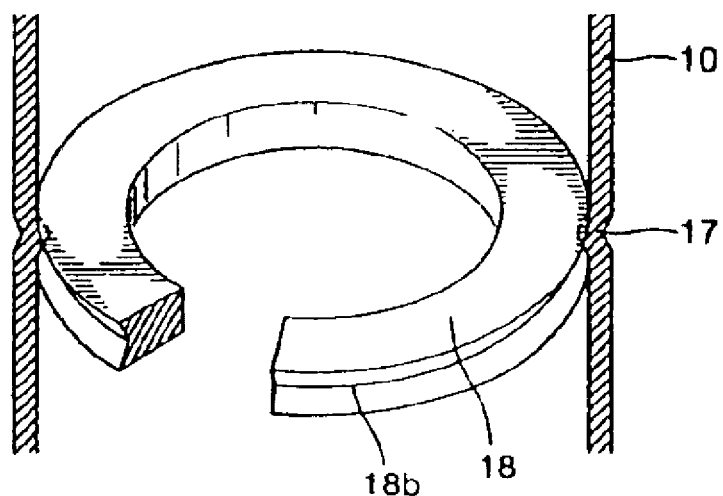
FIG. 8 is a partially cut-away view illustrating a state in which the protruding portion is inserted in a groove formed at an outer circumferential portion of a support ring.
Figure 9:
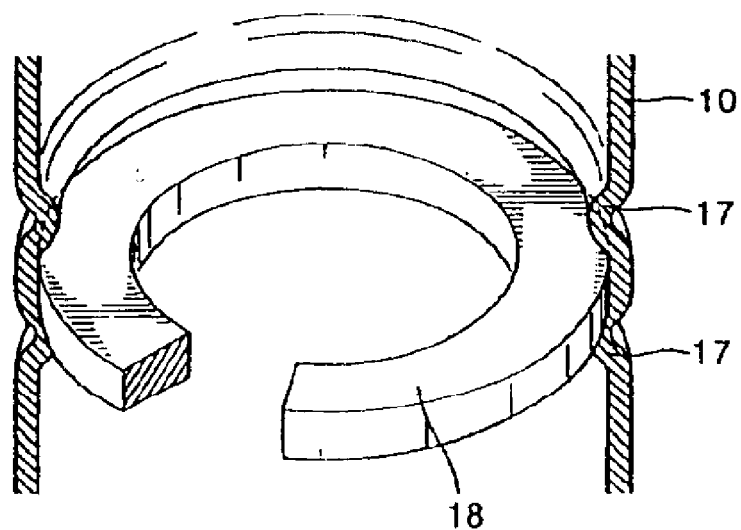
FIG. 9 is a partially cut-away view illustrating a state in which two protruding portions closely contact upper and lower surfaces of the outer circumferential portion of the support ring.
Figure 10:
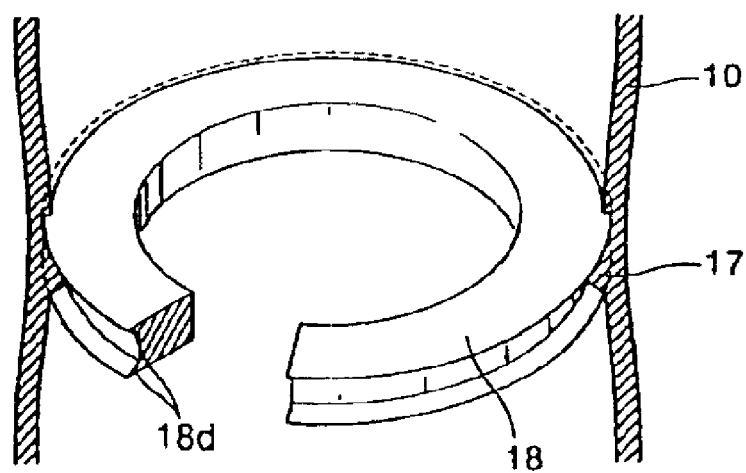
FIG. 10 is a partially cut-away view illustrating a state in which an acute angle portion formed on the outer circumferential portion of the support ring is inserted in the protruding portion.

A filter 50 can be installed at the upper portion of the lower cap 30 which can filter the refrigerant entering through a refrigerant inlet 11 formed in the upper portion of the body 10 and exhausted through a refrigerant outlet 12 after passing through the inside of the receiver-drier 9 as indicated by arrows shown in FIG. 6. When the lower cap 30 is coupled to the body 10, the filter 50 is typically located close to the refrigerant outlet 12 of the body 10. The lower cap 30 is coupled to the inner surface of the body 10. Preferably, a thread is formed on the outer circumference of a middle portion of the lower cap 30 and the lower cap 30 is screw coupled to the inside of body 10. An O-ring 31 having an elastic material functioning of sealing the inside of the body 10 can be inserted in the lower portion of the lower cap 30.

As shown in FIGS. 5 and 6, the body 10 is divided by a filter support portion 15 into an upper portion and a lower portion. At least one refrigerant inlet 11 is formed in the upper portion of the body 10 and at least one refrigerant outlet 12 is formed in the lower portion thereof.

The filter support portion 15 has an inner diameter less than that of the other portion of the body and guides the flow of refrigerant, by contacting the upper end portion of the filter 50, such that the entire amount of the refrigerant entering through the refrigerant inlet 11 can pass the filter 50. Additionally, the filter support portion 15 supports the desiccant 40. Preferably, the filter support portion 15 includes a protruding portion 17 formed by pressing the body 10 by rolling from the outside and a support ring 18 supported by the protruding portion 17, so as to surely guide the refrigerant. A variety of preferred embodiments of the filter support portion 15 having the support ring 18 and the protruding portion 17 are shown in FIGS. 7 through 10. The support ring 18 shown in FIG. 7 has a rib 18a extending from the outer circumferential portion thereof parallel to the body 10 which is inserted in the protruding portion 17 of the body 10. The support ring 18 shown in FIG. 8 has a groove 18b formed in the outer circumferential portion thereof. After the support ring 18 is arranged at a position where the filter support portion 15 is to be formed in the body 10, the protruding portion 17 formed by being pressed by rolling from the outside of the body 10 is inserted into the groove 18b. The support ring 18 shown in FIG. 9 has a simple ring shape. After the support ring 18 is arranged at a position where the filter support portion 15 is to be formed in the body 10, the protruding portion 17 formed by pressing the body 10 by rolling is made to closely contact upper and lower surfaces of the support ring 18. The support ring 18 shown in FIG. 10 has an acute angle portion 18d on the outer circumferential portion thereof. After the support ring 18 is arranged at a position where the filter support portion 15 is to be formed in the body 10, the protruding portion 17 is inserted into the acute angle portion 18d.

Referring back to FIGS. 5 and 6, a coupling portion 16 is formed between the filter support portion 15 and the lower end portion of the body 10 for connection with the lower cap 30. Preferably, a portion of the body 10 at a position where the coupling portion 16 is to be formed is pressed inwardly by rolling. A thread is formed on the inner surface which is pressed so that the coupling portion 16 is formed.

When the O-ring 31 is provided at the lower portion of the lower cap 30, a groove (not shown) to accommodate the O-ring 31 is formed at the lowermost portion of the body 10, that is, at the lower portion of the coupling portion 16.

A method of manufacturing the receiver-drier according to the present invention will now be described. The method of manufacturing the receiver-drier is largely divided into a body forming step, an upper end portion sealing step in which the desiccant 40 is inserted in the upper portion of the body and the upper end portion of the body 10 is sealed by using the upper cap 20 (when the upper cap is separately manufactured), and a lower end portion sealing step in which the lower end portion of the body 10 is sealed by using the lower cap 30 which is manufactured in advance. Among the above steps, the body forming step will be described in detail below.

The body forming step includes a cylinder preparing step, a filter support portion forming step, a coupling portion forming step, a refrigerant inlet forming step, and a refrigerant outlet forming step.

In the cylinder preparing step, a cylinder having a predetermined thickness and length and constituting the body 10 of the receiver-drier is prepared. Preferably, a pipe which is a base material of the cylinder is extruded and cut by a predetermined length, thus forming the cylinder.

The filter support portion forming step includes a step of forming the protruding portion 17 which protrudes inwardly and guides the flow of refrigerant. The protruding portion 17 is preferably formed by pressing the cylinder from the outside using rolling. In particular, the protruding portion 17 supports the support ring 18 to surely guide the refrigerant.

When the support ring 18 is supported by the protruding portion 17, a detailed method of installing the support ring 18 on the protruding portion 17 can vary according to the shape of the support ring 18. To install the support ring 18 of FIG. 7, the protruding portion 17 is first formed and the rib 18a of the support ring 18 is inserted therein. To install the support ring 18 of FIG. 8, the support ring 18 having the groove 18b is arranged at a position where the filter support portion 15 is formed in the cylinder and then the protruding portion 17 formed by pressing the cylinder from the outside using rolling is inserted in the groove 18b. To install the support ring 18 of FIG. 9, the support ring 18 is arranged at a position where the filter support portion 15 is to be formed in the body 10 and then the cylinder is pressed by rolling at a position adjacent to the upper and lower surfaces of the support ring 18 so that the protruding portion 17 formed by pressing can closely contact the upper and lower surfaces of the support ring 18. To install the support ring 18 of FIG. 10, the support ring 18 having the acute angle portion 18d at the outer circumferential portion thereof is arranged at a position where the filter support portion 15 is to be formed in the cylinder and then a portion of the cylinder where the support ring 18 is disposed is pressed from the outside of the cylinder so that the acute angle portion 18d is inserted in the protruding portion 17.

In the coupling portion forming step, the coupling portion for coupling with the lower cap 30 is formed between the filter support portion 15 and the lower end portion of the cylinder. Since the lower cap 30 is inserted in the lower end portion of the body 10 and coupled to the body 10, the inner diameter between the coupling portion 16 and the lower end portion of the body must be not less than the maximum inner diameter of the coupling portion 16.

In order to couple the coupling portion and the lower cap using a thread in consideration of the limit in the size of the inner diameter, preferably, a thread is formed in the coupling portion 16 of the cylinder and the cylinder between the coupling portion 16 and the lower end portion of the body 10 has the same inner diameter as the maximum diameter of the coupling portion 16.

In a method of forming the coupling portion 16 considering the size of the inner diameter, a portion of the cylinder where the coupling portion 16 is to be formed is inwardly pressed by rolling so that the inner diameter of the coupling portion 16 decreases. When the coupling portion 16 is inwardly pressed and a thread is formed on the inner surface thereof, since the coupling portion 16 and the lower end portion of the cylinder has an inner diameter greater than that of the coupling portion 16, the lower cap 30 can be assembled without hindrance.

Figure 11:
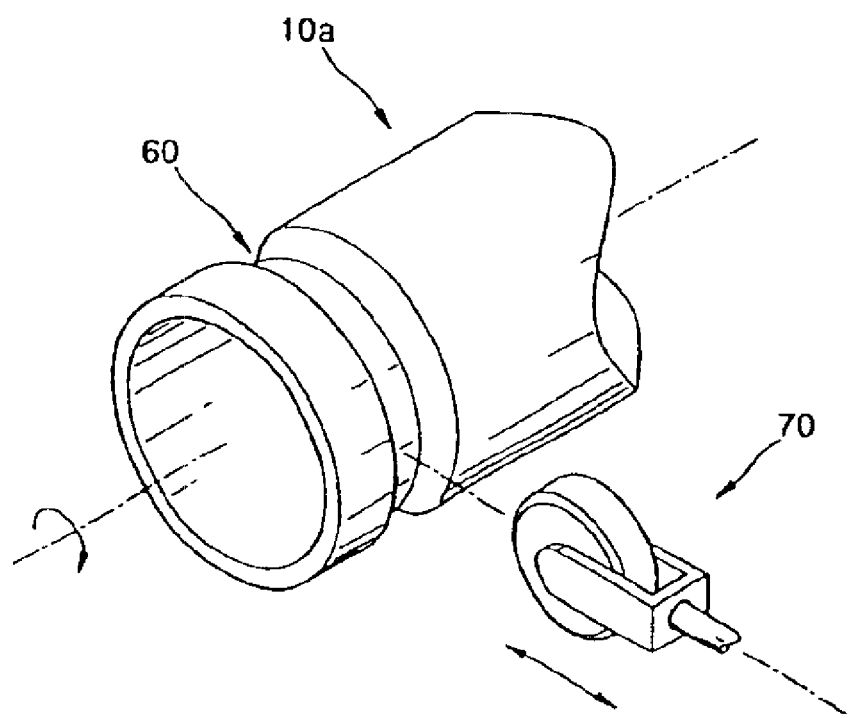
FIG. 11 is a perspective view illustrating a state in which part of the body of the receiver-drier is pressed by a pressing device.

The pressing by rolling is described below with reference to FIG. 11. In the method, a cylinder 10a is rotated by an additional support apparatus (not shown) rotating the cylinder 10a along a center axis and supporting the cylinder 10a. A pressing apparatus 70 which can freely rotate is advanced toward a portion 60 of the cylinder 10a to be pressed, so that the portion 60 is inwardly pressed to a predetermined depth. The shape of a section of the pressed cylinder is affected by the shape of the section of the pressed apparatus 70. Unlike the above description, the support apparatus supporting the cylinder 10a does not rotate and the pressing apparatus 70 can be rotated forwardly and backwardly.

After the cylinder preparation step, the filter support portion forming step, and the coupling portion forming step, by a processing method such as punching or cutting, the refrigerant inlet 11 is formed in the upper portion of the cylinder and the refrigerant outlet 12 is formed in the lower portion thereof. Although it is possible to form the refrigerant inlet 11 or the refrigerant outlet 12 after the cylinder preparing step, when they are primarily formed and a predetermined portion of the cylinder is pressed, there may be a case in which the pressing is not uniformly formed at a position adjacent to the refrigerant inlet 11 and the refrigerant outlet 12. If the above problem is not generated, it is possible to form the refrigerant inlet 11 and the refrigerant outlet 12 prior to the pressing.

As described above, according to the receiver-drier having the above structure according to the present invention and the method of manufacturing the same, the receiver-drier which exhibits durability and does not need an additional bush is provided so that manufacturing cost and time needed to manufacturing the receiver-drier is reduced.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A receiver-drier including a cylindrical body and a lower cap sealing a lower end portion of the body, wherein the body comprises:

a filter support portion sectioning the body into upper and lower portions and having at least one inwardly protruding portion for supporting an upper end portion of a filter accommodated in the lower portion of the body, the protruding portion being formed by pressing the body inwardly;

at least one refrigerant inlet formed in the upper portion of the body;

a coupling portion disposed between the filter support portion and the lower end portion of the body, the coupling portion being pressed toward the inside of the body and coupled to the lower cap by a thread being provided on an inner surface of the pressed body; and at least one refrigerant outlet disposed between the filter support portion and the coupling portion.

2. The receiver-drier as claimed in claim 1, wherein the filter support portion further comprises a support ring supported by the protruding portion.

3. The receiver-drier as claimed in claim 2, wherein the support ring has a rib extending from an outer circumferential portion of the support ring and parallel to an axial direction of the body and the supporting ring is supported as the rib is inserted in the protruding portion.

4. The receiver-drier as claimed in claim 2, wherein the support ring has a groove on an outer circumferential side surface of the support ring and the support ring is supported as the protruding portion is inserted in the groove.

5. The receiver-drier as claimed in claim 2, wherein the support ring is supported by multiple said protruding portions closely contacting upper and lower surfaces of the support ring.

6. The receiver-drier as claimed in claim 2, wherein the support ring has at least one acute angle portion on an outer circumferential side surface of the support ring and is supported as the acute angle portion is inserted in the protruding portion.

7. The receiver-drier as claimed in claim 1, wherein the body is an extruded tube.

8. The receiver-drier as claimed in claim 1, further comprising said filter for filtering refrigerant, which enters through the refrigerant inlet and is exhausted through the refrigerant outlet, wherein said filter is provided in an upper portion of the lower cap.

* * * * *